US012695386B2

(12) United States Patent
Michal

(10) Patent No.: US 12,695,386 B2
(45) Date of Patent: Jul. 28, 2026

(54) POWER DC/DC CONVERSION CIRCUIT

(71) Applicant: STMicroelectronics International N.V., Geneva (SE)

(72) Inventor: Vratislav Michal, Fontanil-Cornillon (FR)

(73) Assignee: STMicroelectronics International N.V., Geneva (CH)

( * ) Notice: Subject to any disclaimer, the term of this patent is extended or adjusted under 35 U.S.C. 154(b) by 28 days.

(21) Appl. No.: 18/763,665

(22) Filed: Jul. 3, 2024

(65) Prior Publication Data
US 2025/0023474 A1    Jan. 16, 2025

(30) Foreign Application Priority Data
Jul. 10, 2023    (FR) ....................................... 2307361

(51) Int. Cl.
*H02M 3/158*        (2006.01)
*H05B 47/10*        (2020.01)

(52) U.S. Cl.
CPC .......... *H02M 3/1582* (2013.01); *H05B 47/10* (2020.01)

(58) Field of Classification Search
None
See application file for complete search history.

(56) References Cited

U.S. PATENT DOCUMENTS

| | | | |
|---|---|---|---|
| 9,543,839 B2 | 1/2017 | Jin et al. | |
| 2002/0159276 A1* | 10/2002 | Deboy | H02M 3/33507 363/20 |
| 2012/0274295 A1 | 11/2012 | Lin et al. | |
| 2014/0211192 A1 | 7/2014 | Grootjans et al. | |
| 2020/0321868 A1 | 10/2020 | Michal et al. | |
| 2022/0131487 A1* | 4/2022 | Chen | H02M 1/0095 |
| 2023/0095408 A1* | 3/2023 | Takamatsu | H02M 3/1582 307/20 |
| 2024/0396585 A1* | 11/2024 | Jang | H04B 1/40 |

OTHER PUBLICATIONS

INPI Search Report and Written Opinion for priority application, FR Appl. No. 2307361, report dated Jun. 17, 2024, 11 pgs.

* cited by examiner

*Primary Examiner* — Kenneth B Wells
(74) *Attorney, Agent, or Firm* — Crowe & Dunlevy LLC

(57)    ABSTRACT

A power conversion circuit includes a first node configured to receive a first voltage referenced to a second node configured to be coupled to a reference potential. A first power converter couples the first node to a third node. A second power converter couples a fourth node to an output node. A first capacitor couples the third node to the fourth node. A first switch connects the output node to the first node. An output switch connects the output node to a load.

18 Claims, 7 Drawing Sheets

POWER DC/DC CONVERSION CIRCUIT

PRIORITY CLAIM

This application claims the priority benefit of French Application for Patent No. 2307361, filed on Jul. 10, 2023, the content of which is hereby incorporated by reference in its entirety to the maximum extent allowable by law.

TECHNICAL FIELD

The present disclosure generally concerns power conversion circuits and related methods.

BACKGROUND

A large variety of power conversion circuits are widely known. The present disclosure more particularly concerns switched mode power supply (SMPS) circuits and more specifically such conversion circuits using a tank capacitor for instantaneously boosting output power.

There is a need in the art for improved power conversion circuits and methods.

There is a need in the art to addresses all or some of the drawbacks of known power conversion devices.

SUMMARY

In an embodiment, a power conversion circuit comprises: a first node configured to receive a first voltage referenced to a second node configured to be coupled to a reference potential; a first power converter coupling the first node to a third node; a second power converter coupling a fourth node to an output node; a first capacitor coupling the third node to the fourth node; a first switch connecting the output node to the first node; and an output switch configured to connect the output node to a load.

One embodiment provides a method of power conversion by a circuit. The circuit comprises: a first node; a first power converter coupling the first node to a third node; a second power converter coupling a fourth node to an output node; a first capacitor coupling the third node to the fourth node; and a first switch coupling the output node to the first node. The method comprises: applying, to the first node, a first voltage referenced to a second node configured to be coupled to a reference potential; and connecting, via an output switch, the output node to a load.

One embodiment provides a power conversion circuit comprising: a first node configured to receive a first voltage referenced to a second node configured to be coupled to a reference potential; a first power converter coupling the first node to a third node; a second power converter coupling the third node to an output node; and a first capacitor coupling the third node to a voltage supply rail; the output node being configured to be coupled to a load via an output switch.

According to an embodiment, the second power converter comprises an inductive element having a first terminal connected to a mid-point of a third switch and a fourth switch, and a second terminal connected to the output node; the third switch coupling the fourth node to said first terminal, and the fourth switch coupling said first terminal to the second node.

According to an embodiment, the first power converter comprises another inductive element having a first terminal connected to a mid-point between a fifth switch and a sixth switch, and a second terminal connected to the third node; the fifth switch coupling the first node to said first terminal of said another inductive element, and the sixth switch coupling said first terminal of said another inductive element to the second node.

According to an embodiment, the first power converter comprises: a fifth switch coupling the first node to the third node, and a sixth switch coupling the third node to the second node.

According to an embodiment, during a first operating phase, the first switch is ON, the output switch is OFF, a first step and a second step alternate at a first frequency and a third step and a fourth step alternate at a second frequency.

According to an embodiment, during a second operating phase, the third step and fourth step alternate at a third frequency, the first power converter being deactivated.

According to an embodiment, during a third operating phase, the first switch is OFF, the output switch is ON, the first step and second step alternate at a fourth frequency and the third step and fourth step alternate at a fifth frequency.

According to an embodiment: in the first operation phase, the first power converter is configured to operate as a buck DC/DC converter to regulate the voltage at the third node from a first voltage to 0V and the second power converter is configured to operate as a boost DC/DC converter to boost the voltage at the fourth node; in the second operating phase, the second power converter is configured to operate as a boost DC/DC converter to boost the voltage at the fourth node up to a maximum voltage value while the voltage at the third node is maintained at the reference potential; and in the third operating phase, the first power converter is configured to operate as a buck DC/DC converter to regulate the voltage at the third node from 0V to the first voltage, and simultaneously the second power converter is configured to operate as a buck DC/DC converter to discharge the fourth node.

According to an embodiment, during the first step, the fifth switch is OFF and the sixth switch is ON, and during the second step, the fifth switch is ON and the sixth switch is OFF.

According to an embodiment: during the third step, the third switch is OFF and the fourth switch is ON, and during the fourth step, the third switch is ON and the fourth switch is OFF.

According to an embodiment, a second capacitor couples the third node to the second node.

According to an embodiment, a third capacitor couples the fourth node to the second node.

According to an embodiment, a fourth capacitor couples the output node to the second node.

According to an embodiment, the first capacitor has a capacitance between 10 μF and 500 μF.

According to an embodiment, the first capacitor is a ceramic capacitor.

One embodiment provides an electronic device comprising: a power source configured to supply a first voltage; a load; a power conversion circuit as described above; the power source being configured to apply the first voltage to the first node; the load being connected to the output node.

According to an embodiment, the power source comprises a battery and the load is a light emitting source.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may include identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be directly connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "on the order of" signify within 10%, and preferably within 5%.

Figure 1:
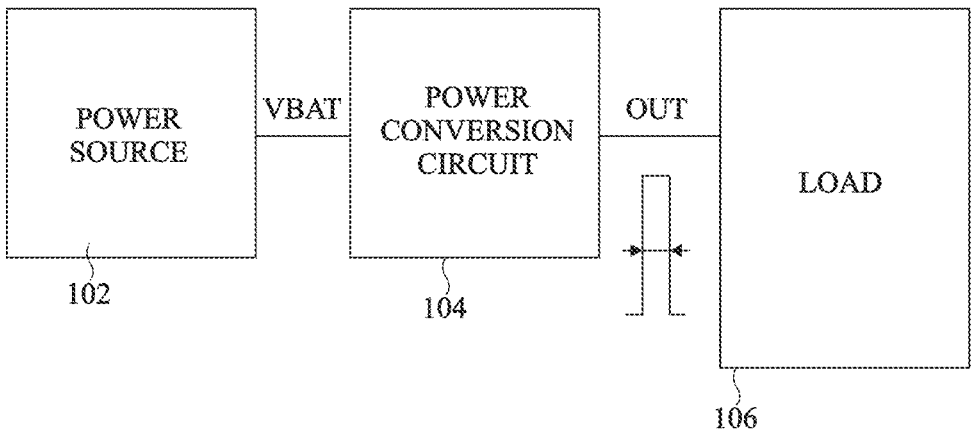
FIG. 1 is a schematic view of an example of an electronic device to which the disclosed embodiments apply.

FIG. 1 is a schematic view of an example of an electronic device to which the disclosed embodiments apply.

The electronic device of FIG. 1 comprises a power source 102 (POWER SOURCE) configured to supply a first voltage VBAT to a power conversion circuit 104 (POWER CONVERSION CIRCUIT). The power conversion circuit 104 is coupled to a load 106 (LOAD) and is configured to supply the load 106 with an output or powering signal OUT.

Depending on the application, the electronic circuit comprises other components and elements not shown, which can also be powered from the power source 102 and/or from the power conversion circuit 104.

The instantaneous voltage or current (power) of the output signal is, for example, superior to the instantaneous first voltage or current (power) supplied by the power source 102.

According to the disclosed embodiments, the power conversion circuit is a switched mode power supply (SMPS) or a plurality of DC/DC converters coupled, or preferably connected, with a tank capacitor. The DC/DC converters are, for example, controlled by a duty cycle D.

According to an example application, the load is composed of one or several laser sources, such as a vertical cavity surface emitting laser (VCSEL). In such an application, the output signal OUT consists in voltage or current pulses. Typically, the instantaneous powering voltage, current or power of the laser source is higher than the voltage, current or power that can be instantaneously provided by the power source 102, and the duration of the powering pulse is on the order of magnitude of a microsecond, generally several microseconds or tens of microseconds.

The energy drawn by the load from the power conversion circuit during the powering pulses is therefore very high. Depending on the power capability of the power source, this energy need may result in collapsing the power source. In particular, in applications where the power source 102 comprises a battery, the power conversion circuit can be unable to deliver the high power required by the load without collapsing the battery voltage. Furthermore, the sequence of power pulses of the laser source does not allow long intervals between two pulses, which results in a need, for the power conversion circuit, to quickly recover additional energy from the power source, in order to power the next laser pulse. Typically, the duty cycle of the powering pulse of a laser source is between 5 and 90 percent.

According to the disclosed embodiments, the power conversion circuit comprises a tank capacitor. Providing a power conversion circuit with a large (greater than several tens of µF) input battery decoupling capacitor is usual. However, the tank capacitor of the disclosed embodiments is coupled, or preferably connected, between at least two DC/DC converters, or inside a configurable DC/DC converter. More particularly, the usage of the energy stored in the tank capacitor is increased.

In the disclosed embodiments, the tank capacitor helps in reaching a power (voltage and/or current) level at the output OUT, which may be higher than the instantaneous power, (voltage and/or current) for example the nominal power (voltage and/or current) level VBAT, provided by the power source 102, which is typically a battery.

In the disclosed embodiments, in the case where the tank capacitor has a nonlinear current-voltage (C-V) characteristic such as with ceramic multilayer capacitors, the impact of the derating of the tank capacitor on its energy storage capability is lowered which leads to an improved usage of the energy stored in the tank capacitor.

Figure 2:
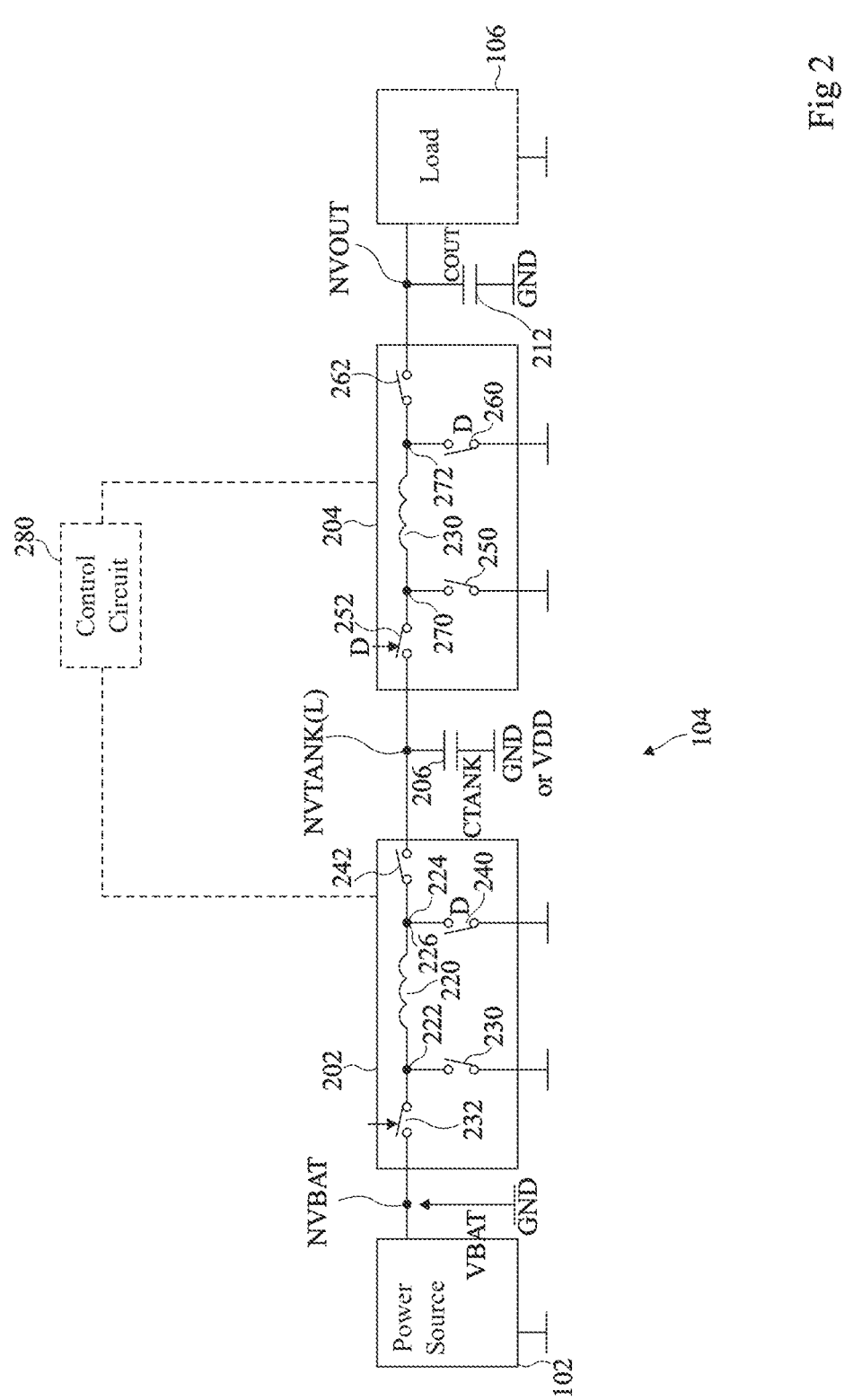
FIG. 2 is a schematic view of an example of a power conversion circuit.

FIG. 2 is a schematic view of an example of a power conversion circuit 104.

In the represented example, the power conversion circuit 104 comprises a first node (NVBAT) configured to receive a first voltage VBAT supplied by the power source 102 and referenced to a second node (GND) and configured to be coupled to a reference potential for example ground potential.

The power conversion circuit 104 comprises a first power converter 202 and a second power converter 204 coupled in series. The first converter 202 couples the first node NVBAT to a third node NVTANK(L). The second power converter 204 couples the third node NVTANK(L) to a fifth node (NVOUT).

The first power converter 202 comprises an inductance element 220, for example a coil, having a first terminal 222 coupled, or preferably connected, to a common terminal between a switch 232 and another switch 230. The switch 232 has another terminal coupled, or preferably connected, to the node NVBAT and the switch 230 has another terminal coupled, or preferably connected, to the second node GND. A second terminal 226 of the coil 220 is coupled, or preferably connected, to a common terminal between switch 240 and switch 242. The switch 242 has another terminal coupled, or preferably connected, to the node NVTANK(L), and the switch 240 has another terminal coupled, or preferably connected, to the second node GND.

The second power converter 204 comprises an inductance element 230, for example a coil, having a first terminal 270 coupled, or preferably connected, to a common terminal between a switch 252 and another switch 250. The switch 252 has another terminal coupled, or preferably connected, to the node NVTANK(L) and the switch 250 has another terminal coupled, or preferably connected, to the second node GND. A second terminal 272 of the coil 230 is coupled, or preferably connected, to a common terminal between switch 260 and switch 262. The switch 262 has another terminal coupled, or preferably connected, to the node NVOUT, and the switch 260 has another terminal coupled, or preferably connected, to the second node GND.

In an example, the ratio of the conduction time for switches 232 and 230, or the ratio of the conduction time for switches 242 and 240, or the ratio of the conduction time for switches 262 and 260, or the ratio of the conduction time for switches 250 and 252 is a duty-cycle D controlled by a signal in pulse width modulation mode generated by a control circuit 280.

The power conversion circuit 104 further comprises a first capacitor 206 (CTANK) coupling the third node NVTANK (L) to ground GND, or to a voltage supply rail VDD. The first capacitor is a tank capacitor, for example a ceramic capacitor with a capacitance between 10 μF and 500 μF.

In an example, the power conversion circuit 104 further comprises, or is coupled to, a switch configured to connect the fifth node NVOUT to a load. In an example this switch is the switch 262 or another unillustrated switch SW_OUT.

In an example, a decupling capacitor 212 (COUT), couples the fifth node NVOUT to the second node GND. The capacitor 212 acts, for example, as a filter.

The operation of the circuit of FIG. 2 alternates CTANK capacitor precharge phases of charging capacitor CTANK from the power source and discharge phases (otherwise called output current generation phases, powering TON phases or powering phases) generating output current or voltage (energy) from the fifth node NVOUT, for example to the load 106. In an example, both precharge and discharge phases can be active simultaneously.

In operation, in a precharge phase, the load is disconnected. This disconnection can be achieved by switching the output switch SW_OUT, or the switch 262, or a switch present in the load, OFF (i.e., switching it to a non-conducting state). The first power converter 202 operates as a buck DC/DC converter until the voltage at NVTANK(L) reaches VBAT. Then it operates as a boost converter until the voltage at NVTANK(L) reaches a maximum value $V_{TANK(max)}$>VBAT. The second power converter 204 remains deactivated.

Once the tank capacitor has been charged, the precharge phase is finished and a high impedance voltage regulation, or a pulse skipping mode (PSK), is performed by the first power converter 202, the second power converter 204 remaining deactivated.

In a discharge phase (TON), the second power converter 204 operates as a buck DC/DC converter if voltage at NVTANK(L)>VBAT and as a boost DC/DC converter if NVTANK(L)<VBAT. It allows generating an output current waveform from the tank capacitor 206. The voltage VTANK across the tank capacitor is thus discharged and turns on the first power converter 202 which then operates as a boost DC/DC converter. During the boost converter 204 operation, the output current is discontinuous and thus may generate large output current ripple which may be undesirable. Similarly, during the boost operation, the dynamic performances of the boost converter alter the desired dynamic performances (e.g., the speed of the regulation). It results in that boost operation of the converter 204 is not desired, but required for the efficient use of the energy available in the tank capacitor 206.

During the discharge phase, the first converter 202 can operate to supply part of the power from the battery to the tank capacitor 206 CTANK, to equalize the input current drawn from the battery and to eventually decrease the value of the tank capacitor CTANK. In another example, the first converter 202 can also be deactivated.

According to the example of FIG. 2, the potential energy $E_{discharge}$ stored in the capacitor CTANK and available for discharge can be formulated according to the following equation 1:

$$E_{discharge} = \frac{1}{2}C_{TANK}\left(V_{TANK(max)}^2 - V_{TANK(min)}^2\right) \tag{1}$$

where $C_{TANK}$ is the capacitance of the capacitor 206 CTANK, $V_{TANK(max)}$ is the voltage VTANK between node NVTANK(L) and second node GND at the beginning of the discharge phase, and $V_{TANK(min)}$ is the voltage between node NVTANK(L) and second node GND at the end of the discharge phase. It can be seen that the available energy $E_{discharge}$ increases with the square of $V_{TANK(max)}$. The energy storage increase or similarly the decrease of the $C_{TANK}$ value and therefore $C_{TANK}$ capacitor volume is obtained by increasing $V_{TANK(max)}$.

The energy delivered by the capacitor CTANK during a discharge phase can be formulated according to the following equation 2:

$$E_{OUT} = V_{OUT}I_{OUT}T_{ON} \tag{2}$$

where $V_{OUT}$ is the voltage provided at the fifth node NVOUT during the discharge phase, $I_{OUT}$ the current drawn from the fifth node NVOUT by the load during the discharge phase, and $T_{ON}$ the duration of the discharge phase. Ideally, $E_{discharge}$=$E_{OUT}$. It leads to the following equation 3 and equation 4 which are valid for $V_{TANK(min)}$>$V_{OUT}$:

$$T_{ON} = \frac{1}{2}\frac{C_{TANK}\left(V_{TANK(max)}^2 - V_{TANK(end)}^2\right)}{V_{OUT}I_{OUT}} \tag{3}$$

$$C_{TANK} = \frac{2 \cdot T_{ON}V_{OUT}I_{OUT}}{\left(V_{TANK(max)}^2 - V_{TANK(min)}^2\right)} \tag{4}$$

An advantage of the disclosed embodiments is that, with a tank capacitor at the input side of the power conversion circuit, higher voltage variations are allowed across the TANK capacitor when compared to the voltage variations of the capacitor used as an input decoupling capacitor at the battery terminal. Higher voltage variation on the TANK capacitor electrodes signifies that capacitor is absorbing and delivering a larger amount of the energy between charging and discharging phases. Higher voltage variation on CTANK therefore leads to a better usage of the capacitor volume (i.e., better capacitor-volume efficiency) when compared to capacitors with a small voltage variation (ripple) used for decoupling input (e.g., battery) voltage.

An advantage of the circuit of FIG. 2 is that it allows to discharge the tank capacitor below the voltage of the load 106. It means that more energy is obtained from the capacitor and thus capacitor needed value (volume and cost) is reduced (e.g., 50%).

A drawback of the circuit of FIG. 2 is that the alternating between buck and boost configurations is complicated and efficiency is low since the number of switches involved is important. High input/output current ripple is also created at the switching frequency due to the discontinuous current during the boost mode, and simultaneously the dynamic performances (i.e., the regulation speed) are decreased.

The different embodiments herein propose a power conversion circuit comprising a first node configured to receive a first voltage, for example from a power source, referenced to a second node configured to be coupled to a reference potential; a first power converter coupling the first node to a third node; a second power converter coupling a fourth node to a fifth node; a first capacitor coupling the third node to the fourth node; a first switch connecting the fifth node to the first node; and a second switch configured to connect the fifth node to the load 106.

The proposed power conversion circuits provide an improved usage of the energy stored in the tank capacitor, with less switches than the example of FIG. 2, which improves the overall efficiency. It also allows to discharge the tank capacitor below the voltage of the load.

The proposed power conversion devices avoid using first and second converters in both buck/boost mode during the discharge phase TON. It lowers output ripple and allows a high transient regulation speed because the output converter is in buck mode during the discharge.

Figure 3:
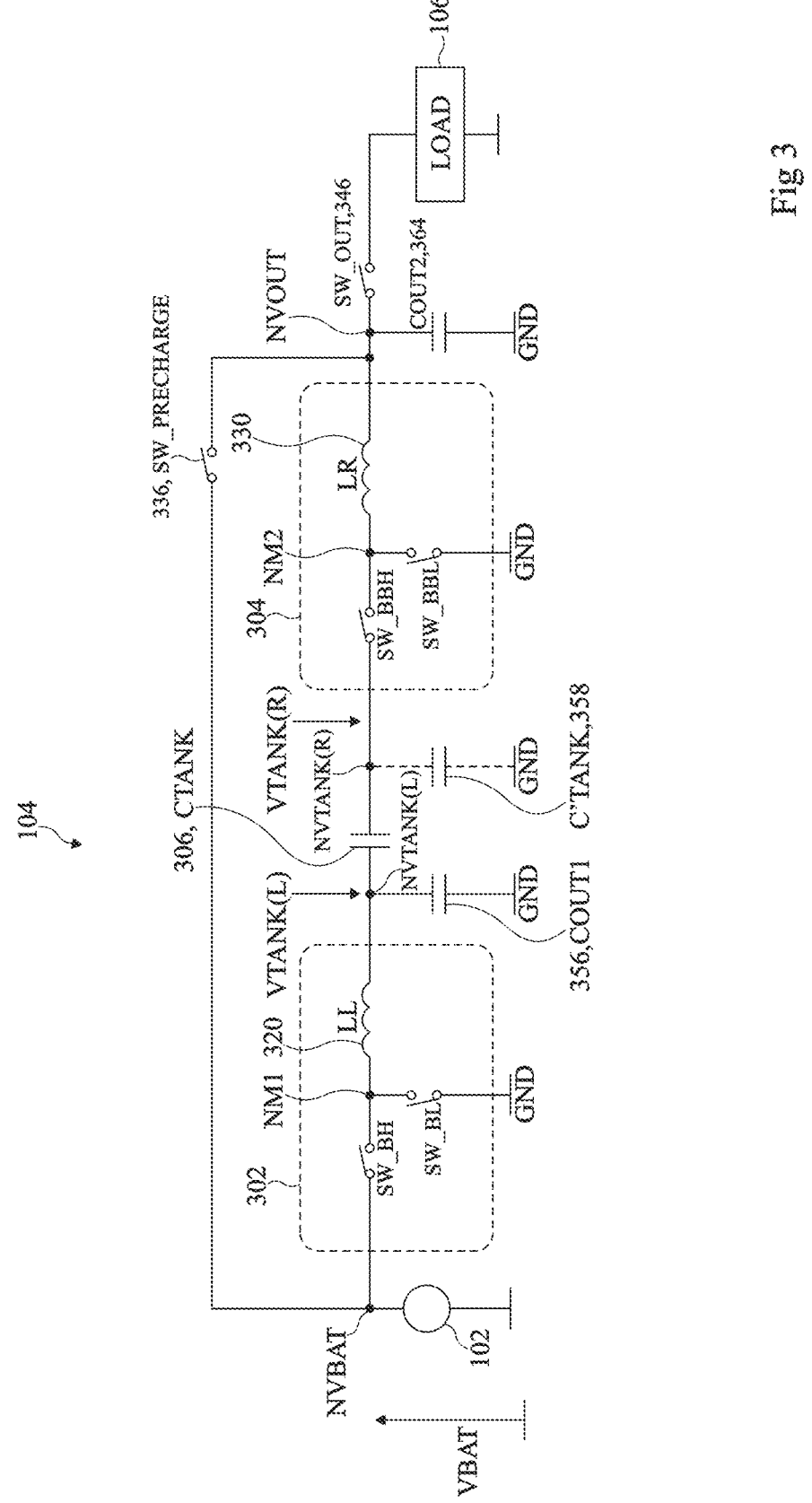
FIG. 3 is a schematic view of a different implementation of a power conversion circuit according to an embodiment.

FIG. 3 is a schematic view of a different implementation of the power conversion circuit 104 according to an embodiment of the present disclosure.

In the represented example, the power conversion circuit 104 comprises a first power converter 302 series connected with a first tank capacitor 306 (CTANK) itself series connected to a second power converter 304.

In an example, the first capacitor (CTANK) has a capacitance between 10 μF and 500 μF and is, for example, a ceramic capacitor.

The power conversion circuit 104 comprises a first node (NVBAT) configured to receive the first voltage (VBAT) referenced to a second node configured to be coupled to a reference potential (GND).

The first power converter 302 couples the first node NVBAT to a third node NVTANK(L) which is coupled, or preferably connected, to a first electrode of the tank capacitor CTANK. The first power converter 302 is configured to operate continuously as a buck converter (i.e., the voltage at third node NVTANK(L) is lower than voltage at node NVBAT).

The second power converter 304 couples a fifth node (NVOUT), which is the output of the power conversion device, to a fourth node (NVTANK(R)), which is coupled, or preferably connected, to a second electrode of the tank capacitor 306, CTANK. The second power converter 304 operates as a buck converter during the discharge phase and as a boost converter during the precharge phase.

The first capacitor 306 couples the third node NVTANK (L) to the fourth node NVTANK(R). In other words, the capacitor 306 is series connected between the first power converter 302 and the second power converter 304.

In the represented example, the power conversion circuit 104 further comprises a first switch 336 (SW_PRECHARGE) connecting the fifth node NVOUT to the first node NVBAT.

In the represented example, the power conversion circuit 104 further comprises a second switch 346 (SW_OUT) configured to connect the fifth node NVOUT to the load 106. Both switches 336 and 346 are static switches (i.e., they switch at a low frequency corresponding to the change of the precharge and discharge phases, as compared to the switching frequency of switches of the first power converter 302 and second power converter 304).

In the represented example, the second power converter 304 comprises an inductive element 330 (LR) having a first terminal connected to a mid-point (NM2) between a third switch SW_BBH and a fourth switch SW_BBL, and a second terminal coupled, or preferably connected, to the fifth node NVOUT.

The third switch SW_BBH couples the fourth node NVTANK(R) to the first terminal of the coil LR (i.e., to the middle point NM2), and the fourth switch SW_BBL couples the first terminal of the coil LR to the second node GND.

The first power converter 302 comprises an inductive element 320 (LL) having a first terminal coupled, or preferably connected, to a mid-point (NM1) between a fifth switch SW_BH and a sixth switch SW_BL. A second terminal of the inductive element 320 is coupled, or preferably connected, to the third node NVTANK(L). In other words, the inductive element 320 couples the node NVTANK(L) to the middle point NM1.

The fifth switch SW_BH couples the first node NVBAT to the first terminal of the inductive element LL (i.e., to the middle point NM1). The sixth switch SW_BL couples the first terminal of the inductive element LL to the second node GND.

In the represented example, a decoupling second capacitor 356 (COUT1) couples the third node NVTANK(L) to the second node GND. An optional third capacitor 358 (CTANK) further couples the fourth node NVTANK(R) to the second node (GND). A decoupling fourth capacitor 364 (COUT2) further couples the fifth node to the second node GND.

The inductive elements 320, 330 are, for example, coils.

In operation, during a first pre-charge operating phase (PRECHARGE1), the switch SW_PRECHARGE is ON and the second switch SW_OUT is OFF. DC/DC converter 302 operates in buck mode and is decreasing voltage VTANK(L) at node NVTANK(L) from VTANK(L)_max (e.g., VBAT) to VTANK(L)_min (e.g., 0V). During this phase, the converter 304 operates as a boost, maintaining or increasing VTANK(R) at level higher than VBAT. CTANK capacitor voltage is thus increasing.

During a second pre-charge operating phase (PRECHARGE2), the first power converter 320 is preferably deactivated and keeps VTANK(L)=0V with switch SW_BH off and SW_BL ON, or it regulates the output voltage to VTANK(L)_min. During this phase, the converter 304 operates as a boost, increasing VTANK(R) to level VTANK(R)_max. The tank capacitor 206 voltage is thus increasing.

During a third operating phase (TON), also called a powering phase, the first switch SW_PRECHARGE is OFF, and the second switch SW_OUT is ON. Both power converters 302 and 304 operate in buck mode. The first converter 302 provides an increase of the voltage VTANK(L), while the second converter 304 discharges the voltage VTANK(R) to the load. During this phase, the voltage across the tank capacitor VTANK is decreased. While the majority of the output power is delivered from the tank capacitor 206, part of the power is also delivered from the power source VBAT. In the case where the power source is a battery, current can be approximately written as $I_{bat}=I_{OUT}*D_{320}*D_{304}$, where Dx states for the duty-cycle of the respective converter x=302,304. Voltage VTANK(R) can be discharged down to VDD in order to allow the converter to operate in boost mode afterwards during the precharge phase.

After the powering phase, a new first pre-charge phase is performed to be able to perform a new powering phase, etc. In reality, many pre-charges and powering phases are performed in an alternating manner.

During the first pre-charge phase PRECHARGE1, a first switching step and a second switching step alternate at a first frequency and a third switching step and a fourth switching step alternate at a second frequency. In an example, during the first switching step, the fifth switch SW_BH is OFF and the sixth switch SW_BL is ON, and during the second switching step, the fifth switch SW_BH is ON and the sixth switch SW_BL is OFF. In another example, during the third switching step, the third switch SW_BBH is OFF and the fourth switch SW_BBL is ON, and during the fourth switching step, the third switch SW_BBH is ON and the fourth switch SW_BBL is OFF.

During the second pre-charge operating phase PRECHARGE2, the third switching step and fourth switching step alternate at a third frequency.

During the third operating phase TON, the first switching step and second switching step alternate at a fourth frequency and the third switching step and the fourth switching step alternate at a fifth frequency.

Compared to the alternating frequency of the pre-charge and powering phases, the switching steps alternate at a high switching frequency. As an example of embodiment, the first, second, third, fourth and fifth switching frequencies of alternation is greater than the kilohertz, for example at a fixed value comprised between few kilohertz to a Megahertz. In an example, the ratio of the SW_BH and SW_BL switches conduction time, or of the SW_BBH and SW_BBL switches conduction time are defined by a duty-cycle. The duty-cycle is controlled by a signal, for example in pulsed width modulation mode, generated by a control unit for example similar to the control unit 280.

First, second, third, fourth and fifth switching frequencies are adjusted for example to be similar or different or for some of them to be similar.

The current peak drawn from the power source is, for example, limited by the use of the facultative 358 CTANK capacitor referenced to ground.

Figure 4:
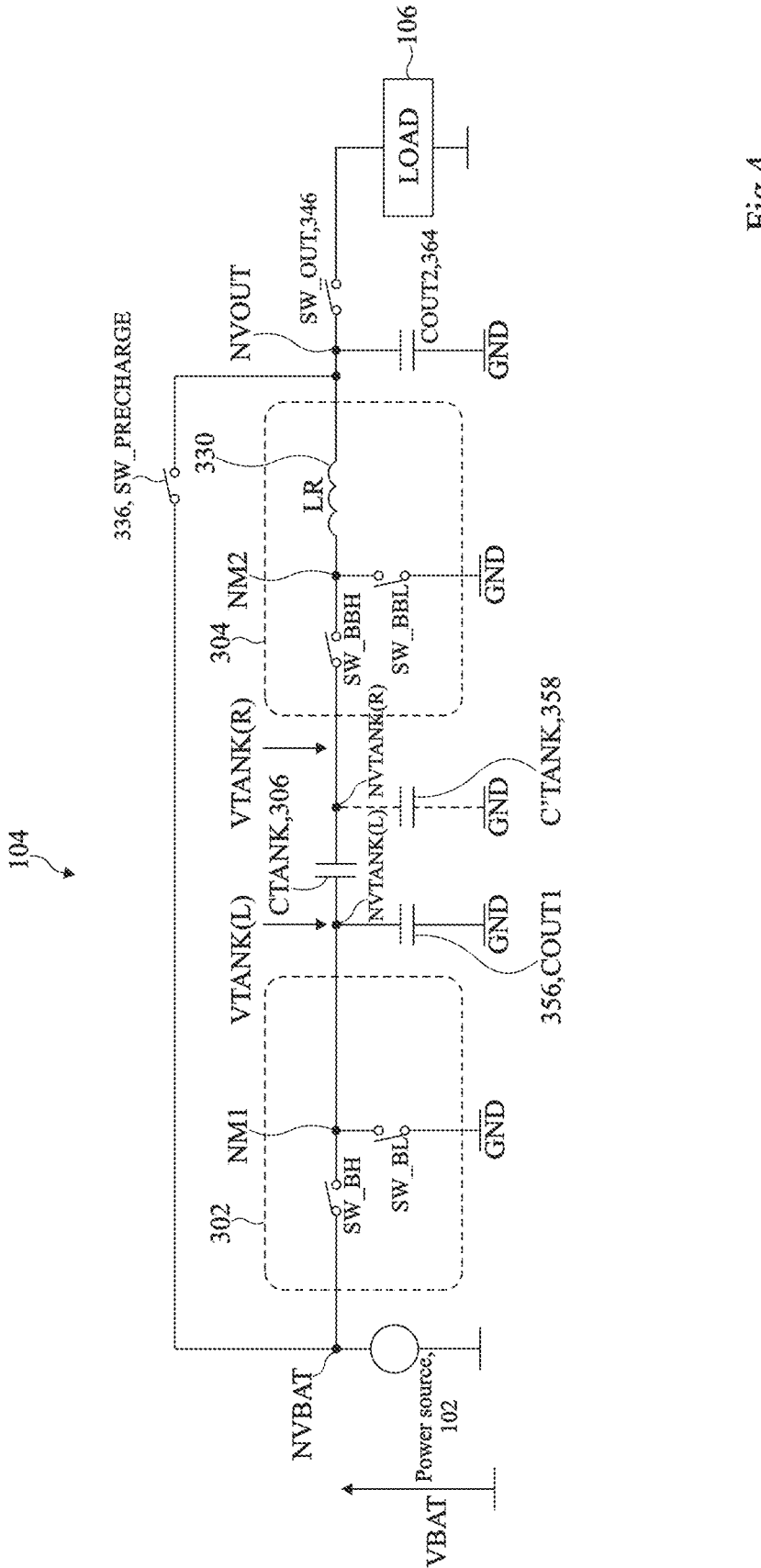
FIG. 4 is a schematic view of a different implementation of a power conversion circuit according to another embodiment.

FIG. 4 is a schematic view of a different implementation of a power conversion circuit 104 according to another embodiment of the present disclosure.

The power conversion circuit of FIG. 4 is similar to the power conversion circuit of FIG. 3 except that the inductive element 320 of the first power converter 302 is not present. In other words, the node NVTANK(L) is directly connected to the mid-point NM1.

The operation of the circuit of FIG. 4 is similar to the operation of the example of FIG. 3 except that, during the pre-charges phases, the switches SW_BH and SW_BL are in a static configuration. Their commutation allows to bring VTANK(L) abruptly to the reference potential GND. Also, as another difference, during the powering phase TON, the switches SW_BH and SW_BL are in a static configuration.

Their commutation allows to abruptly bring VTANK(L) from the reference potential GND up to VBAT.

An additional advantage of the example of FIG. 4 is that the circuitry is simpler and the energy density is increased since only one coil is used.

This allows to implement the circuit from FIG. 3 with a single inductive element, and only one power-stage switching at high frequency.

As a consequence, the circuit of FIG. 4 is simpler as it contains only one power converter commutating at high switching frequency, and the energy density is increased since only one coil is used. However, the abrupt switching of SW_BH and SW_BL can generate an undesired peak at the output, which may perturb the accuracy of the output delivered power.

Figure 5:
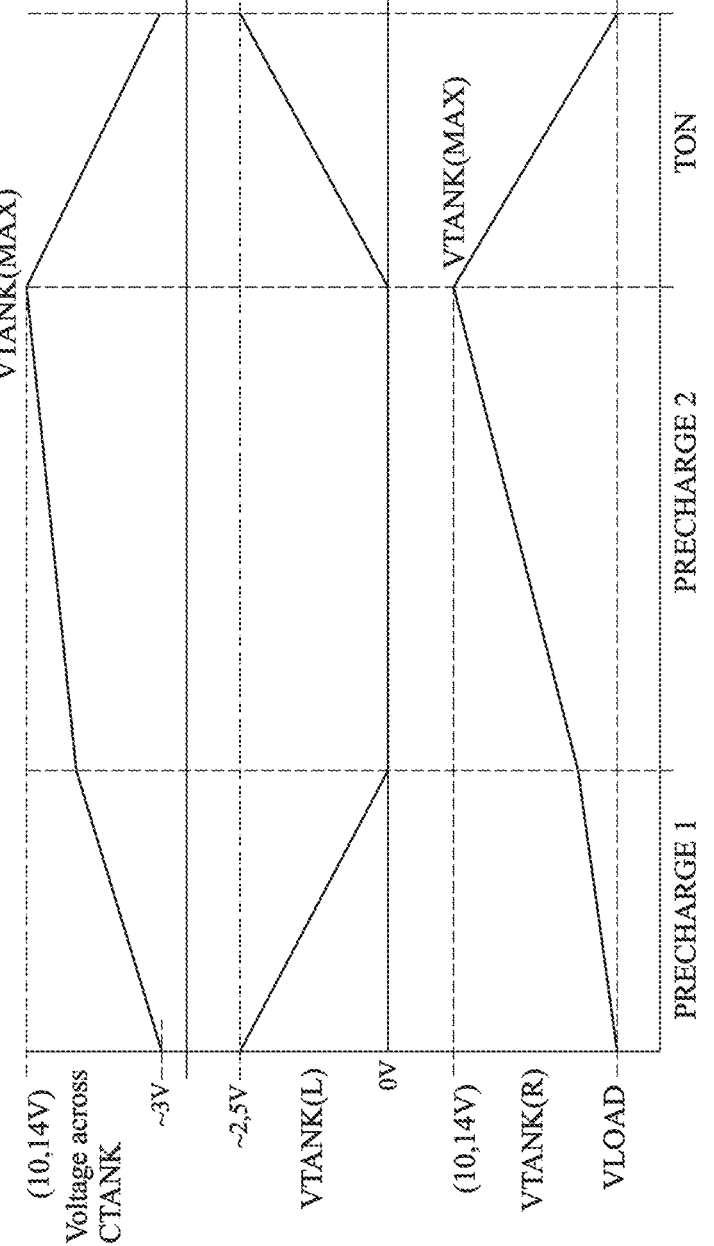
FIG. 5 is a timing diagram illustrating the operating steps of FIG. 3.

FIG. 5 is a timing diagram illustrating the operating steps of the circuit shown in FIG. 3.

More particularly, the diagram of FIG. 5 illustrates the voltage at nodes NVTANK(L) and NVTANK(R) and the resulting voltage across the tank capacitor (Voltage across CTANK) as a function of the time.

At the end of a previous powering phase TON, the tank capacitor voltage VTANK(R)_min–VTANK(L)_max is low and needs to be recharged. Preferably, the voltage VTANK (L)_max is close to VDD, and VTANK(R)_min is slightly above VDD in order to allow the converter 304 to operate in a boost mode in the next precharge phase. The charging phase comprises two precharge phases: PRECHARGE1 and PRECHARGE2.

During the first operation phase PRECHARGE1, the first power converter 302 operates as a buck DC/DC converter (i.e., VBAT>VTANK(L) to regulate the voltage VTANK(L) at third node NVTANK(L) from VTANK(L)_max e.g. VBAT (for example 2.5V) to VTANK(L)_min, e.g. VTANK (L)_min=0V (ground level). Meanwhile, NLOAD=VBAT and the second power converter 304 operates as a boost DC/DC converter to boost the voltage VTANK(R) at the fourth node NVTANK(R) from the voltage close to VLOAD of the load to an intermediate value VTANK(R)_max1. The resulting voltage across the tank capacitor 306 VTANK(R)_max1 increases to about 5 to 8V for example.

During the second operating phase PRECHARGE2, the second power converter 304 is configured to operate as a boost DC/DC converter to increase the voltage VTANK(R) at the fourth node NVTANK(R) up to a maximum voltage value VTANK(MAX) (for example from the intermediate value to 10V or up to 14V) while the voltage at the third node NVTANK(L) is maintained at the reference potential VTANK(L)_min, GND, 0V, by the first power converter 302.

The resulting voltage across the tank capacitor 306 increases during first and second operating phase PRECHARGE1 and PRECHARGE2 from initial value at the end of a previous discharge phase TON (Vtank(R)_min–Vtank (L)_max) to (VTANK(R)_max–VTANK(L)_min). The voltage across the tank capacitor 306 reaches then from about 10V or up to 14V for example. This means that the variation of the voltage across the tank capacitor can be increased.

During the third operating phase TON, the first power converter 302 operates as a buck DC/DC converter to regulate and increase the voltage VTANK(L) at third node NVTANK(L) from 0V to the first voltage VBAT (about 2.5V for example), and simultaneously the second power converter 304 operates as a buck DC/DC converter and regulate output voltage from VTANK(R) to VLOAD, VTANK(R) being assumed to be superior to VLOAD, in order to discharge the fourth node NVTANK(R) down to for example 6V. This increases the time when VTANK(R)_max approaches VBAT (i.e., the amount of energy that can be draught from the capacitor CTANK 306 is increased). In other words, the voltage at node NVTANK(L) is continuously increased by the first power converter 302 which operates as a buck DC/DC converter, while node NVTANK(R) is continuously discharged by second power converter 304 which operates as a buck DC/DC converter to deliver output power. The tank capacitor is therefore seemingly charged by the first power converter during the powering phase. In other words, during this powering phase Ton, part of the power is also transferred from the power source 102. This is convenient because it allows a reasonable power sharing between the power delivered from the tank capacitor CTANK and power delivered from the power source 102.

The example operation of FIG. 3 shows that the first power converter 302 is only used as a buck DC/DC converter which implies less switches, high transient regulation speed and low output ripple. The second power converter 304 operates as a buck during the powering phase TON which is essential to maintain a high regulation speed and a low ripple current injected at the output node.

Another advantage of the example of FIG. 3 is that a high discharge of the tank capacitor 306 is achieved with a discharge from VTANK(MAX) (for example 10-14V) down to the voltage of the load (for example 6V) minus the first voltage VBAT (for example 2.5V). On the contrary, existing solutions would provide a discharge of the tank capacitor 306 only from VTANK(MAX) (for example 10-14V) down to the voltage of the load (for example 6V). More energy is therefore extracted from the tank capacitor 306.

Figure 6:
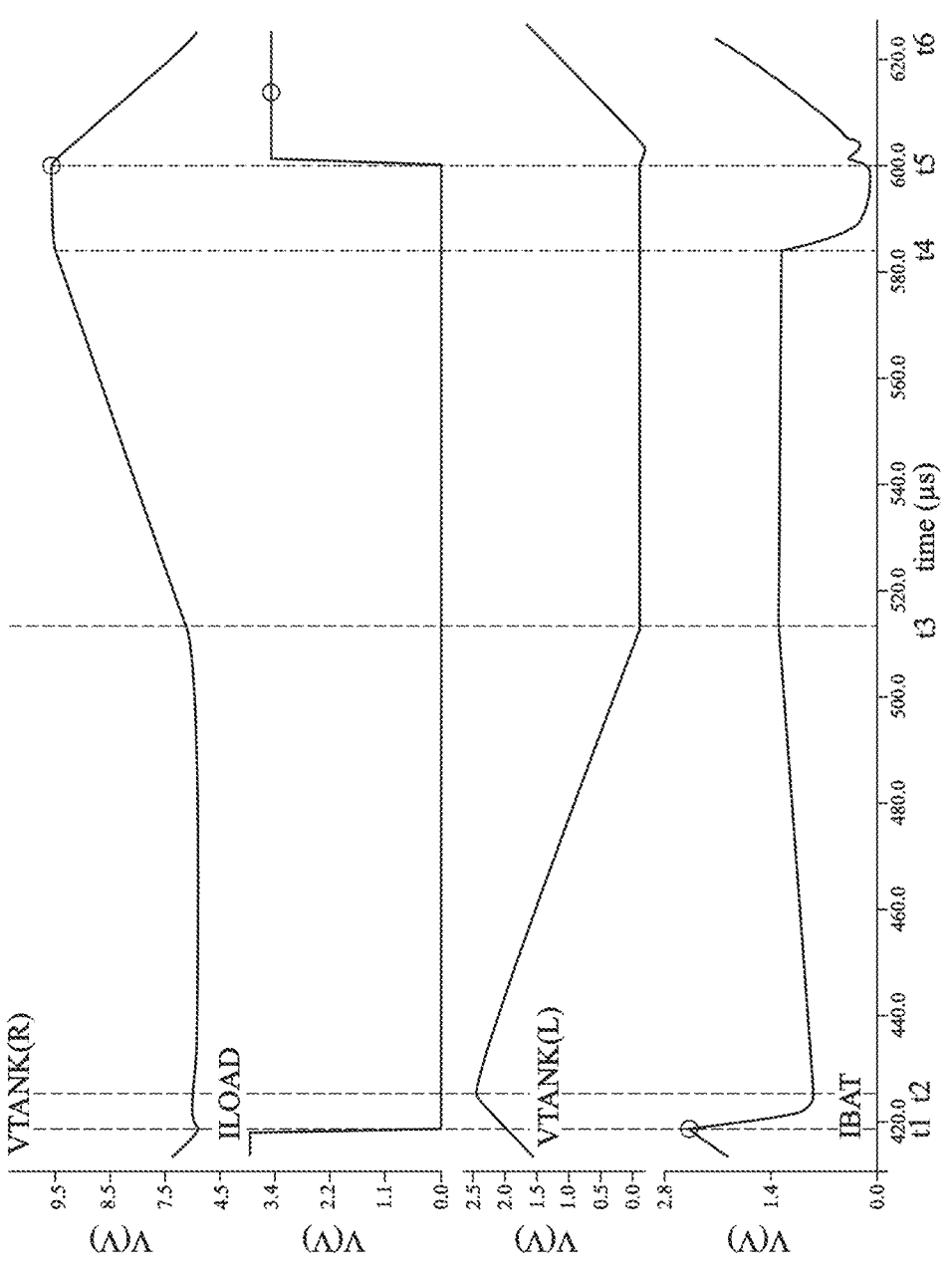
FIG. 6 is another timing diagram illustrating the operating steps of FIG. 3.

FIG. 6 is another timing diagram illustrating the operating steps of FIG. 3.

More precisely, the voltage VTANK(R) present at node NVTANK(R), the load current (ILOAD), the voltage VTANK(L) present at node NVTANK(L) and the current drawn from the power source (IBAT) are represented for one sequence comprising the first and pre-charge phases and the powering phase. The first pre-charge phase PRECHARGE1 is represented between a time t2 and a time t3. The second pre-charge phase PRECHARGE2 is represented between time t3 and a time t4. The powering phase TON is represented between a time t5, after t4, and a time t6. Due to the representing window, the powering phase TON continues after t6 to a time t1 and the cycle can be repeated.

During a time period between times t1 and t2 the powering phase is terminated, ILOAD falls to 0, the current IBAT decreases by more than a factor 2, VTANK(R) very slightly increases, and VTANK(L) still continues to slightly increase as IBAT is decreasing relatively slowly.

Between times t2 and t3, VTANK(R) is slightly increased to 7V, ILOAD is kept at zero, VTANK(L) decreases almost linearly from 2.5V (VBAT) to about 0V, and IBAT is slightly increased linearly.

Between times t3 and t4, VTANK(R) increases linearly from 7V up to 10V, ILOAD remains at 0, VTANK(L) remains stable, and IBAT remains stable.

At time t4, the charging is completed. The first power converter 302 maintains VTANK(L) at a low voltage (i.e., ground), while the second power converter 304 maintains the voltage VTANK(R) at VTANK(R)_max. This can be achieved by the pulse-skipping or hysteretic regulation of VTANK(R)_max. During a time period between time t4 and time t5, VTANK(R), VTANK(L) and ILOAD remain stable.

During the powering phase TON, ILOAD remains stable at a high level, VTANK(R) decreases almost linearly to reach 7V at time t1, VTANK(L) increases linearly from 0 to 2.5V (VBAT) and IBAT increases almost linearly until a maximum at time t1.

Figure 7:
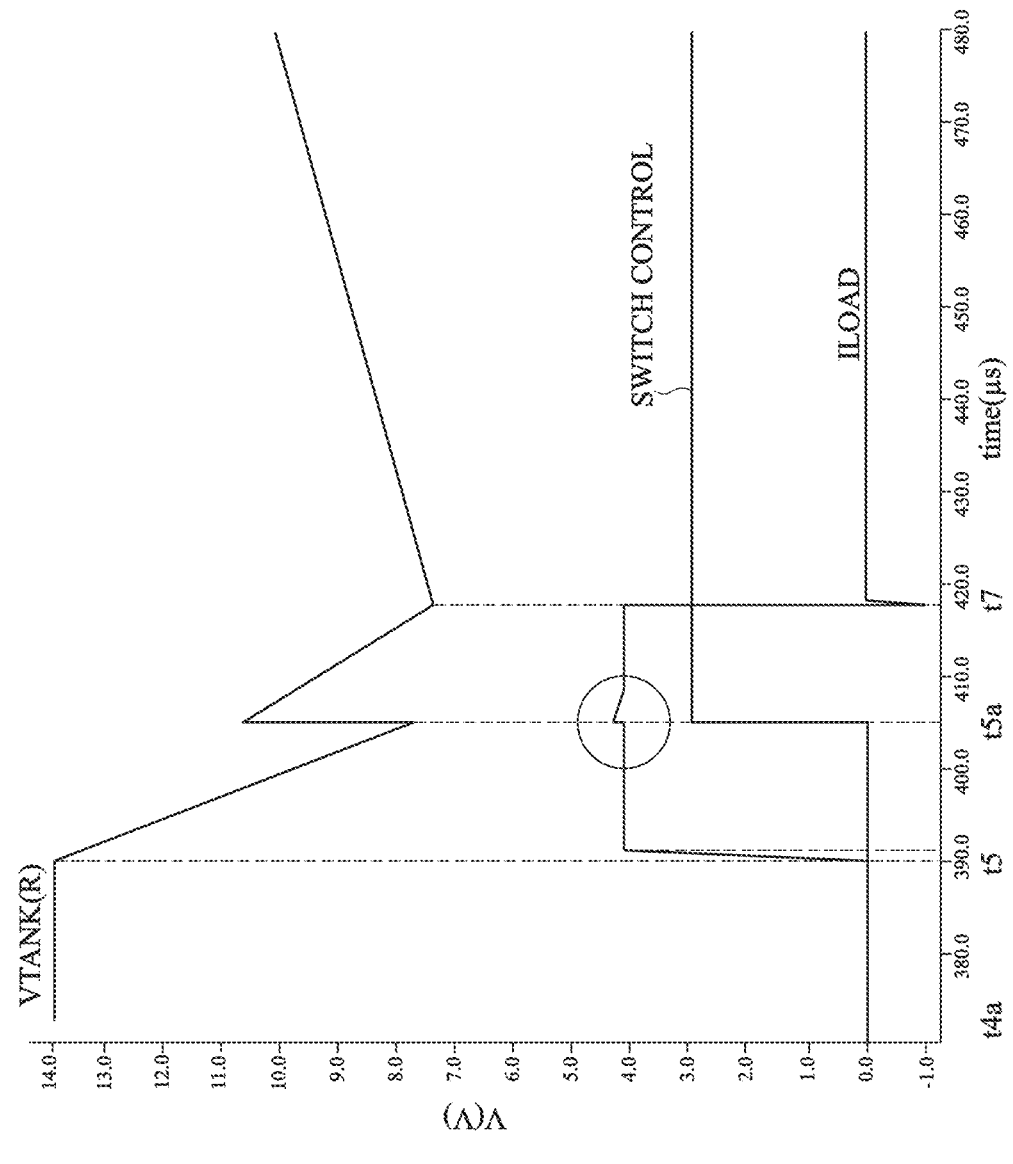
FIG. 7 illustrates a timing diagram illustrating the operating steps of FIG. 4.

FIG. 7 illustrates another timing diagram illustrating the operating steps of FIG. 4. The example of FIG. 7 represents more particularly VTANK(R), ILOAD and a control signal (SWITCH_CONTROL) of one of the switches SW_BH or SW_BL during a part of a powering phase followed by a precharge phase.

Between a time t4a, for example comprised between times t4 and t5 of FIG. 6, and a time t5 similar to time t5 of FIG. 6, VTANK(R) is kept stable at 14V, ILOAD is at 0 and the switch controlling signal is kept at a low level. The period between time t4a and time t5 corresponds to the end a pre-charge phase.

To start a powering phase TON, from time t5 to a time t5a, VTANK(R) is discharged almost linearly by the second power converter 304 while ILOAD rises rapidly to further be maintained stable by a feedback control loop, and the switches SW_BL and SW_BH switch controlling signals are kept at a low level.

At time t5a, the switch controlling signal is brought to a high level which causes VTANK(L) to rise almost at the same time from 0 up to VBAT. As a consequence, VTANK(R) also rises instantly from about 8V to about 11V which causes a small glitch (circled on the diagram) on the output load supply. This operation brings nevertheless more energy from the tank capacitor allowing to deliver more power to the output.

From time t5a to a time t7, VTANK(R) decreases almost linearly down to 8V, ILOAD remains stable and the switch controlling signal is kept at a high level.

After time t7, ILOAD drops to 0, the switch controlling signal is kept at a high level and VTANK(R) increases almost linearly to pre-charge again the tank capacitor 306. In a non-illustrated example, the switch control signal switches also during the precharge to bring the voltage VTANK(L) to ground GND.

Various embodiments and variants have been described. Those skilled in the art will understand that certain features of these embodiments can be combined and other variants will readily occur to those skilled in the art. In particular, switches can be implemented by transistors, inductive elements can be implemented by coils.

Moreover, the operation sequences of the power converter 302 when operating as a buck DC/DC converter can be arbitrarily modified to meet best performances.

Finally, the practical implementation of the embodiments and variants described herein is within the capabilities of those skilled in the art based on the functional description provided hereinabove. In particular, concerning the example of FIG. 3, wherein the inductive element 320 and the switch SW_BH can be exchanged with each other so that the inductive element 320 couples the node NVBAT and the middle point NM1, and the switch SW_BH couples the inductive element 320 to the node NVTANK(L). In this case the tank capacitor is not series connected between the first and second power converters 302, 304 but instead couples node NVTANK(L) to the second node GND. Thus, nodes NVTANK(L) and NVTANK(R) are merged into one single node. Also, in this case, the switch SW_PRECHARGE no longer coupled the node NVBAT but instead couples the middle point NM1 to the node NVOUT. Moreover, in this case, the inductive element 330 and the switch SW_BBH are exchanged so that the inductive element 330 couples the node NVTANK(L) to the middle point NM2 and the switch SW_BBH couples the middle point NM2 to the node NVOUT.

The invention claimed is:

1. A power conversion circuit, comprising:
a first node configured to receive a first voltage referenced to a second node configured to be coupled to a reference potential;
a first power converter coupling the first node to a third node;
a second power converter coupling a fourth node to an output node;
a first capacitor coupling the third node to the fourth node;
a first switch connecting the output node to the first node; and
a second switch configured to connect the output node to a load.

2. The circuit of claim 1:
wherein the second power converter comprises an inductive element having a first terminal connected to a mid-point between a third switch and a fourth switch, and a second terminal connected to the output node; and
wherein the third switch couples the fourth node to said first terminal, and the fourth switch couples said first terminal to the second node.

3. The circuit of claim 2:
wherein the first power converter comprises another inductive element having a first terminal connected to a mid-point between a fifth switch and a sixth switch, and a second terminal connected to the third node; and
wherein the fifth switch couples the first node to said first terminal of said another inductive element, and the sixth switch couples said first terminal of said another inductive element to the second node.

4. The circuit of claim 2, wherein the first power converter comprises:
a fifth switch coupling the first node to the third node; and
a sixth switch coupling the third node to the second node.

5. The circuit of claim 4, wherein during a first operating phase, the first switch is ON, the second switch is OFF, a first switching step and a second switching step alternate at a first frequency and a third switching step and a fourth switching step alternate at a second frequency.

6. The circuit of claim 5, wherein during a second operating phase, the third switching step and the fourth switching step alternate at a third frequency, the first power converter being deactivated.

7. The circuit of claim 6, wherein during a third operating phase, the first switch is OFF, the second switch is ON, the first switching step and the second switching step alternate at a fourth frequency and the third switching step and the fourth switching step alternate at a fifth frequency.

8. The circuit of claim 7, wherein during a second operating phase, the third switching step and the fourth switching step alternate at a third frequency, the first power converter being deactivated, and wherein:
during the first operation phase, the first power converter is configured to operate as a buck DC/DC converter to regulate the voltage at the third node from the first voltage to 0V and the second power converter is configured to operate as a boost DC/DC converter to boost the voltage at the fourth node;
during the second operating phase, the second power converter is configured to operate as a boost DC/DC converter to boost the voltage at the fourth node up to a maximum voltage value while the voltage at the third node is maintained at the reference potential; and
during the third operating phase, the first power converter is configured to operate as a buck DC/DC converter to regulate the voltage at the third node from 0V to the first voltage, and simultaneously the second power converter is configured to operate as a buck DC/DC converter to discharge the fourth node.

9. The circuit of claim 5, wherein during the first switching step, the fifth switch is OFF and the sixth switch is ON, and wherein during the second switching step, the fifth switch is ON and the sixth switch is OFF.

10. The circuit of claim 5, wherein during the third switching step, the third switch is OFF and the fourth switch is ON, and wherein during the fourth switching step, the third switch is ON and the fourth switch is OFF.

11. The circuit of claim 1, further comprising a second capacitor coupling the third node to the second node.

12. The circuit of claim 11, further comprising a third capacitor coupling the fourth node to the second node.

13. The circuit of claim 12, further comprising a fourth capacitor coupling the output node to the second node.

14. The circuit of claim 1, wherein the first capacitor has a capacitance between 10 µF and 500 µF.

15. The circuit of claim 1, wherein the first capacitor is a ceramic capacitor.

16. A power conversion circuit, comprising the power conversion circuit of claim 1.

17. An electronic device, comprising:
a power source configured to supply a first voltage;
a load;
the power conversion circuit according to claim 1;
wherein the power source is configured to apply the first voltage to the first node; and
wherein the load is connected to the output node.

18. The electronic device of claim 17, wherein the power source comprises a battery and the load is a light emitting source.

* * * * *